US006059298A

United States Patent [19]

Tucker

[11] Patent Number: 6,059,298

[45] **Date of Patent: *May 9, 2000**

[54] FOLDABLE CREEPER

[75] Inventor: Mark H. Tucker, Deposit, N.Y.

[73] Assignee: E-Z Red Company, Deposit, N.Y.

[ * ] Notice: This patent is subject to a terminal disclaimer.

[21] Appl. No.: 09/338,501

[22] Filed: Jun. 23, 1999

Related U.S. Application Data

[63] Continuation of application No. 08/735,954, Oct. 23, 1996, Pat. No. 5,947,489.

[51] Int. Cl.$^{7}$ ........................................ B62B 3/02

[52] U.S. Cl. ........................................ 280/32.6; 280/35

[58] Field of Search ........................................ 280/32.6, 32.5, 280/30, 35, 79.11, 37, 639, 640, 651; 403/102; 297/16, 45; 5/114, 116

[56] References Cited

U.S. PATENT DOCUMENTS

| | | | |
|---|---|---|---|
| Re. 35,732 | 2/1998 | Shockley | 280/32.6 |
| 1,302,301 | 4/1919 | Broome | 280/37.6 |
| 1,394,493 | 10/1921 | Grazer | 280/32.6 |
| 4,889,352 | 12/1989 | Chamberlin, Jr. et al. | 280/32.6 |
| 5,611,552 | 3/1997 | Miles et al. | 280/32.6 |
| 5,883,053 | 1/1999 | Berry | 280/32.6 |

*Primary Examiner*—Richard M. Camby
*Attorney, Agent, or Firm*—Breiner & Breiner

[57] ABSTRACT

A folding creeper articulates two rectangular platform sections with padded cushions and three caster wheels to fold the sections back to back into a compact storage configuration with wheels in between. The articulation joint simply pivots the two sections away from a stable creeper state with the joint locked in place to withstand loading at the abutment joint between the two juxtapositioned platform sections.

18 Claims, 2 Drawing Sheets

6
6
11
12
13
14
15
17
20
21
22
25
26
27
28
29
31
33
34

FOLDABLE CREEPER

This is a continuation of application Ser. No. 08/735,954 filed Oct. 23, 1996 now U.S. Pat. No. 5,947,489.

FIELD OF THE INVENTION

This invention relates to creepers for permitting mechanics to work on the undercarriage of automotive vehicles, and more particularly it relates to folding creepers which fold into a compact storage configuration.

BACKGROUND OF THE INVENTION

Creepers are well known in the art. For example, U.S. Pat. No. 5,330,209 to J. L. Pool, issued Jul. 19, 1994, discloses a Low Profile Mechanics Creeper. This patent is directed to the feature of mis-shaping the frame of the creeper upon which the creeper platform is mounted to position caster wheel pivot mounts above the planar platform surface upon which the mechanic lies. However, there is no provision for folding the creeper into a compact storage configuration when not in use, which is an objective of the present invention.

Representative of several problems encountered in prior art foldable creepers is U.S. Pat. No. 1,226,585 of W. E. Parker, et al., May 15, 1917. To enable folding, in this case, inward folding of side flaps is required before folding end to end. The creeper is undesirably complex and interferes with any provision of mid-length weight bearing caster wheels. Accordingly, the mid-position hinging structure must include a weight bearing mechanism of sufficient ruggedness to support a substantial portion of a mechanic's weight and probable added forces should the mechanic push against the vehicle undercarriage. The ability to carry the mechanic's weight at the midsection and the reliability of the hinging mechanism is further compromised by the placement of a pair of weight supporting caster wheels at either end of the creeper, thus tending to sag the creeper and distort the folding mechanisms. Furthermore, with the caster wheels mounted directly onto the platform underside for support, further disadvantages occur. Thus, it is difficult to position the platform close to the floor working surface. This is a problem since space to reach the undercarriage is usually limited. Also the platform structure must be shaped to allow the caster wheels to protrude through the platform in the folded position.

A further problem with the prior art foldable creepers is seen in U.S. Pat. No. 5,451,068 to T. Shockley, Sep. 19, 1995 for Transformable Mechanic's Creeper, wherein the cushions of the creeper must be removed before folding and stored separately.

It is therefore an object of this invention to provide a novel and improved foldable creeper that resolves the aforesaid prior art problems.

A further object is to provide a foldable creeper which is strong, rugged and simple to construct without complex or expensive assembly and which is easily and safely folded into a compact and easily handled assembly.

Further objects, features and advantages of the invention will be apparent from the following description and the accompanying drawings.

SUMMARY OF THE INVENTION

The creeper of this invention has two articulated rectangular shaped wheeled cushioned assembly units that are placed end to end and joined into a comfortable weight bearing creeper platform for moving a mechanic under a vehicle for undercarriage repairs. The cushioned units have an articulation mechanism for folding the creeper platform from its bistable position for creeping under vehicles into a second bistable position in which the two units are folded back to back into a compact storage configuration with caster wheels positioned between the two juxtapositioned cushion assemblies lying in substantially parallel planes.

The cushioned assembly units have cushions permanently affixed to a weight bearing platform base member. The units have side rails along two sides, spaced from the cushions so that they may be grasped for carrying. Supporting transverse straps attach the rails to the platform base. Three caster wheels are attached to the metal bars for each unit, so that when two cushion arrays are placed end to end one wheel is on each side of the resulting creeper in a weight bearing support intermediate the length of the resulting six wheeled creeper.

The two end to end cushioned units are articulated at joints between rail ends on opposite sides of the creeper body, thereby permitting the two cushioned units to be folded back to back with wheels therebetween to form a compact storage configuration with the two outermost cushions lying substantially in parallel planes. The metal rails constitute handles and in their parallel folded configuration permit the creeper to be stood on edge, or to be hung from a hook if desired.

The articulation joints on opposite sides of the creeper are formed by a length of U-shaped metal channel link that nests the ends of the metal rails on the respective end to end cushion units. The opposite ends of the metal channel link have the U bottom portion removed, thereby to form parallel walls serving to journal a pivot joint with each of the rails. The rails are thus pivotable in the articulation joints for folding the two cushion units together with the caster wheels therebetween.

BRIEF DESCRIPTION OF THE DRAWINGS

In the accompanying drawings, wherein like reference characters are employed in the respective views for similar features to facilitate comparison.

DESCRIPTION OF THE PREFERRED EMBODIMENT

Figure 1:
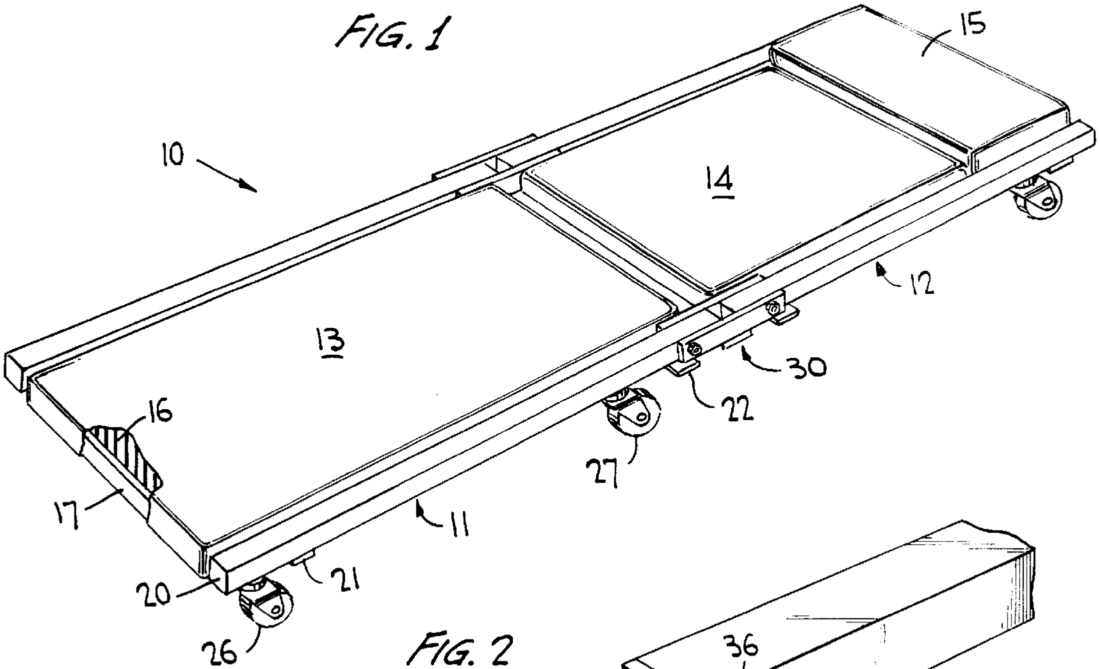
FIG. 1 is a perspective view, partly broken away, of the folding creeper configuration afforded by this invention ready for use of a mechanic in a stable unfolded configuration for servicing the undercarriage of a vehicle.

As seen from FIG. 1, the creeper 10 is formed from two wheeled framework-cushion assemblies 11, 12 supporting upper padded platform surfaces comprising cushions 13, 14, one having the headrest 15, upon which a mechanic lies to move under a vehicle to work on the undercarriage. As seen from the broken away left end, the cushions 13, 14 comprise plastic covered foam 16, or the like, resting upon and permanently attached to a weight bearing support platform or baseboard 17 shown as metal, but which could be of wood, or the like.

The framework disposes the generally square profile side rails 20 on each side of the cushions 13, 14, and spaced therefrom so that they may be grasped as handles when folding or carrying the creeper assembly. Near respective ends of each cushioned unit 11, 12, the transverse bracing straps 21, 22 extend from side rail to side rail and are attached by bolts or the like 25 to the bottom support platform 17, as better seen in the bottom view of FIG. 4.

Figures 3, 4, 5, 6:
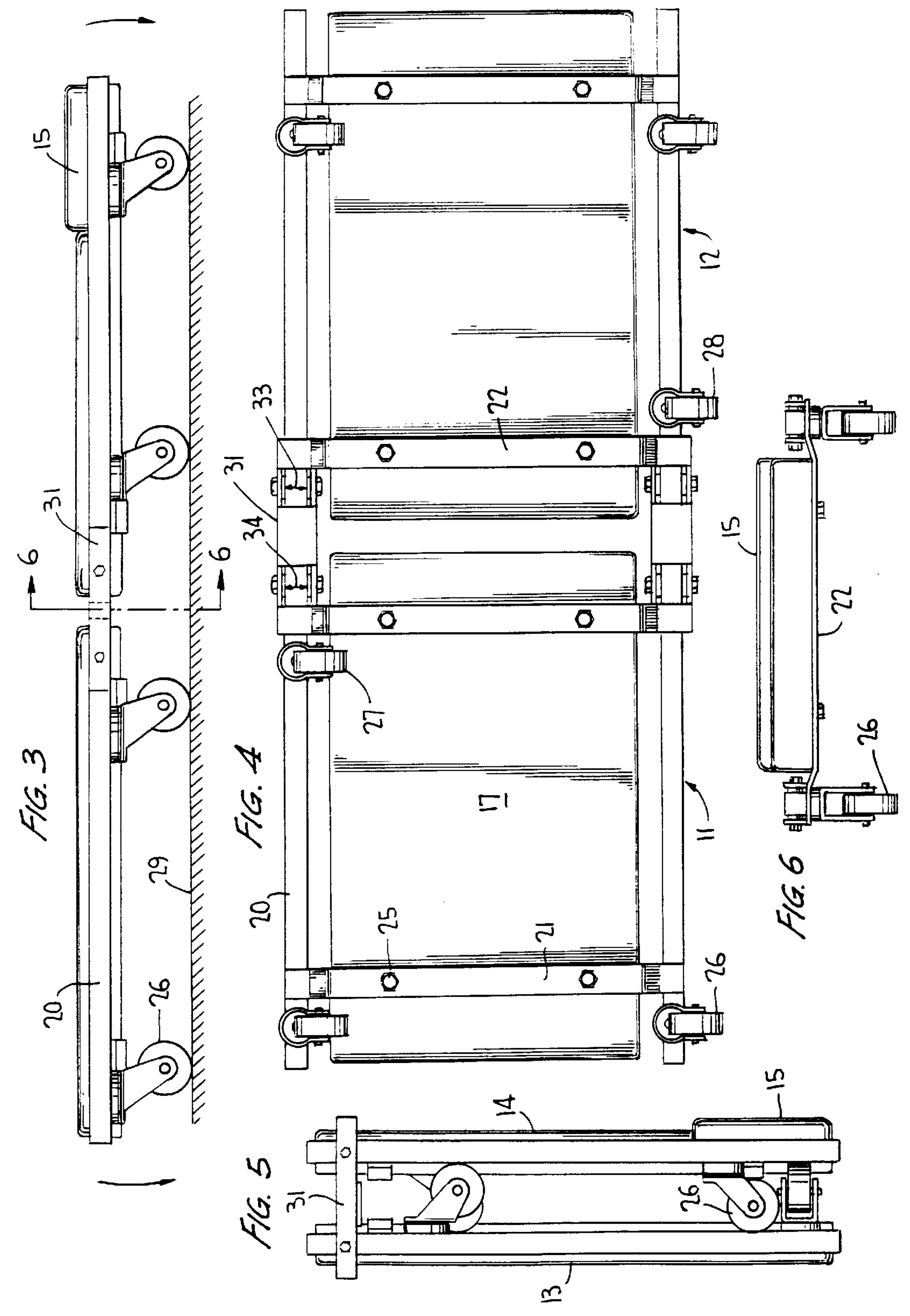
FIG. 3 is a side view in elevation of the creeper shown in FIG. 1.
FIG. 4 is a bottom view of the creeper.
FIG. 5 is a standing-on-end, side view of the folded up creeper.
FIG. 6 is an end view in elevation looking into lines 6—6 of FIG. 3.

In FIG. 4, the arrangement of the six caster wheels 26, etc. is shown, three caster wheels being attached to each framework-cushion unit 11, 12. In this creeper, each unit is movably supported on three caster wheels for a total of six creeper casters aligned with three wheels on each side of the creeper. The caster wheels 27, 28 thus provide intermediate weight bearing support in the mid-region of the creeper, which moves along a work surface 29 as shown in FIG. 3. The front and rear end casters 26 and the intermediate casters 27, 28 are pivoted from respective side rails 20 of the respective framework assemblies 11, 12 on opposite sides of the creeper. By pivoting these caster wheels 26, etc. in the side rails 20 at positions between the back panel 17 and upper surface of the cushions 13, 14, the advantage is obtained of lowering the creeper surface closer to the floor and giving the mechanic more room for underchassis work space. Also the outer rail mount of the caster wheels makes the creeper more stable by eliminating any tipping forces that might be encountered by forces applied near the edges. These side rail braces 20 extend along and are substantially the same length as the length of the rectangular cushions 13, 14 and corresponding integral supporting platforms 17. The upper surface of the rail braces 20 are substantially coplanar with the upper cushion surfaces of the creeper.

Thus the folding creeper of this invention has two units 11, 12 are connected together end to end by the articulation member 30, including separate pivot joints for the respective rail braces 20 on the leading and trailing units 11, 12 on opposite sides of the creeper. The articulation structure is shown in detail in FIG. 2.

The articulation joint is formed by nesting the juxtaposed meeting ends of two square profile side rail bracing members 20 on the respective two units 11, 12, into the U-shaped length channel iron articulation member 31, as shown in phantom view. As also seen from the bottom view of FIG. 4, the opposing ends 33, 34 of the articulation member 31 have the U bottom portion removed. Thus, the articulation member 31 serves together with the extended transverse ends of strap 22 as a detent locking stop holding the creeper stable in a weight bearing joint in the unfolded position. The joint thus permits the two units 11, 12 to fold towards the caster wheels 26 into the back to back compact assembly of FIG. 5. Therein the two cushioned units 11, 12 pivot on the articulation member 31 about the pivot bolts 33*a*, 34*a* to terminate back to back in parallel planes with the caster wheels 26 extending therebetween to provide a compact folded array. As seen in FIG. 5, the unit may be compactly stored by standing on any one edge. Conversely it may be stored with the cushion 13 downward on a flat surface such as a shelf.

Figure 2:
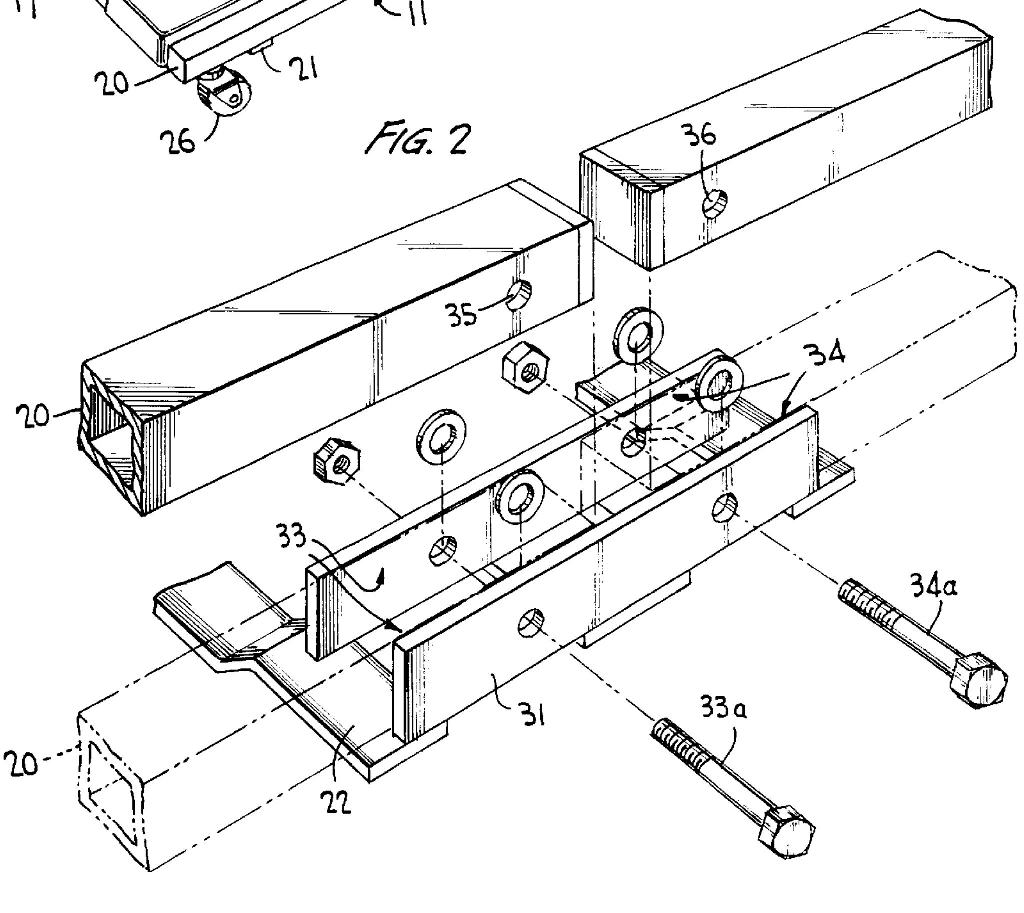
FIG. 2 is a broken away, exploded view in perspective of the foldover articulation joint assembly on one side of the creeper, looking into the creeper.

Pivot pins 33*a*, 34*a*, seen in FIG. 2, respectively extend through the apertures in end portions 33, 34 of the articulation member 31 and the respective mating aperture arrays 35, 36 in the juxtaposed ends of rails 20 of the respective cushioned units 11, 12. Thus respective units 11, 12 fold towards the folded-up position of FIG. 5, as permitted by the open ends 33, 34 where the bottom of the U channel is removed. Note that in the creeper position, the rail braces 20 are supported on both the extensions of the transverse straps 22 and the bottom of the U-shaped channel to hold the extended creeper assembly stable and supported across the seam between the juxtapositioned end to end rectangular cushioned units 11, 12. Note that the two units 11, 12 are of the same cross section and only differ in the arrangement of the headrest 15 and the position of the intermediate caster wheels 27, 28 thus contributing to compactness in the storage state.

Thus, having advanced the state of the art, those features of novelty setting forth the spirit and nature of the invention are defined with particularity in the following claims.

It is claimed:

1. A foldable creeper comprising first and second articulated units, each said unit including in combination a weight-supporting platform, first and second longitudinal bracing rails and a set of caster wheels;

said platform includes two longitudinal edges extending between proximate and distal ends, each said bracing rail disposed alongside one of said longitudinal edges and affixed to said platform by at least two straps;

said set of caster wheels consisting of only three caster wheels wherein one said caster wheel affixed to a lower surface of said first rail and two said caster wheels affixed to a lower surface of said second rail;

said first and second units being attached to each other at said distal ends by at least one hinge such that said units are pivotable between coplanar and parallel folded positions.

2. The foldable creeper of claim 1, including two said hinges connecting said first unit first and second rails to said second unit second and first rails, respectively.

3. The foldable creeper of claim 1, including two said hinges alongside opposite said longitudinal edges comprising U-channel shaped bracing members for receiving juxtaposed ends of said bracing rails, wherein the channel bottoms at opposite ends of said bracing members are removed and have pivotable attachments to said bracing rails near respective said juxtaposed ends.

4. The foldable creeper of claim 1, wherein said coplanar position has said juxtaposed ends opposed in said bracing member and in close proximity to one another.

5. The foldable creeper of claim 1, wherein each said unit includes a total of two said straps and each of said two straps is a transverse strap affixed to said first and second rail lower surfaces and a lower surface of said platform.

6. The foldable creeper of claim 3, wherein said parallel folded position has said caster wheels on each said two units facing inward and nested between said bracing rails.

7. The foldable creeper of claim 1, wherein said bracing rails have lengths approximately the same as respective said longitudinal edges and sufficiently spaced from said longitudinal edges to allow gripping of said bracing rails.

8. The foldable creeper of claim 2, wherein said two said caster wheels are disposed near opposite ends of said second bracing rail and said one said caster wheel is disposed near said distal end of said first bracing rail.

9. The foldable creeper of claim 6, wherein the height of said casters is approximately equivalent to the distance between said U-channel pivotable attachments.

10. The foldable creeper of claim 9, wherein said caster wheels are positioned on said bracing rails to allow folding of said creeper into said parallel position.

11. The foldable creeper of claim 3, wherein cushions are permanently secured to said platforms.

12. The foldable creeper of claim 1, wherein each said unit has two wheels positioned near one end of the creeper and one wheel positioned near a creeper midsection so that when the units are placed end to end the single wheels are on opposite sides of the creeper.

13. The foldable creeper of claim 1, wherein said articulation means includes a pair of U-channel bracing members connecting said two units.

14. The foldable creeper of claim 1, wherein said units are pivotable between relatively coplanar and parallel positions.

15. The foldable creeper of claim 14, wherein said parallel position includes said caster wheels being nested between said units.

16. The foldable creeper of claim 5, wherein the height of said caster wheels defines the distance between said units in said parallel position.

17. The foldable creeper of claim 1, wherein said units include cushions permanently secured thereto.

18. A folding creeper having two units connected by articulation means, each unit being movably supported on a set of caster wheels, said set of caster wheels consisting of three caster wheels for a total of six creeper caster wheels aligned with three wheels mounted near each side of the creeper.

* * * * *

UNITED STATES PATENT AND TRADEMARK OFFICE

CERTIFICATE OF CORRECTION

PATENT NO. : 6,059,298
DATED : May 9, 2000
INVENTOR(S) : Mark H. Tucker

It is certified that error appears in the above-identified patent and that said Letters Patent is hereby corrected as shown below:

Column 4,
Line 42, "1" should read "3" --.

Column 6,
Line 1, "5" should read "15" --.

Signed and Sealed this

Twenty-eighth Day of August, 2001

*Attest:*

Nicholas P. Godici

*Attesting Officer*

NICHOLAS P. GODICI
*Acting Director of the United States Patent and Trademark Office*